Figure 1:
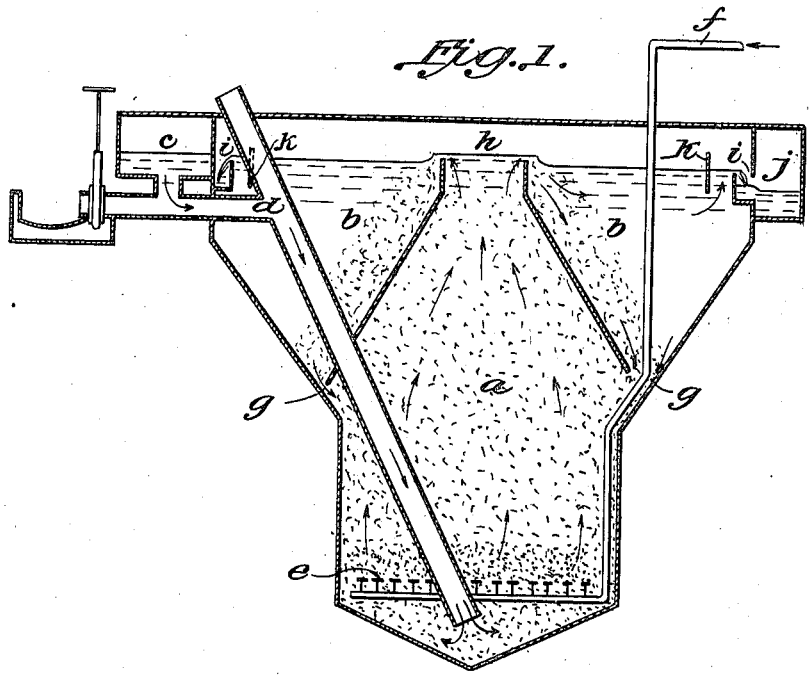

L. C. FRANK.
PROCESS OF PURIFYING SEWAGE OR OTHER WASTES AND APPARATUS THEREFOR.
APPLICATION FILED APR. 2, 1915.

1,139,024.

Patented May 11, 1915.
2 SHEETS—SHEET 1.

Inventor:
Leslie C. Frank

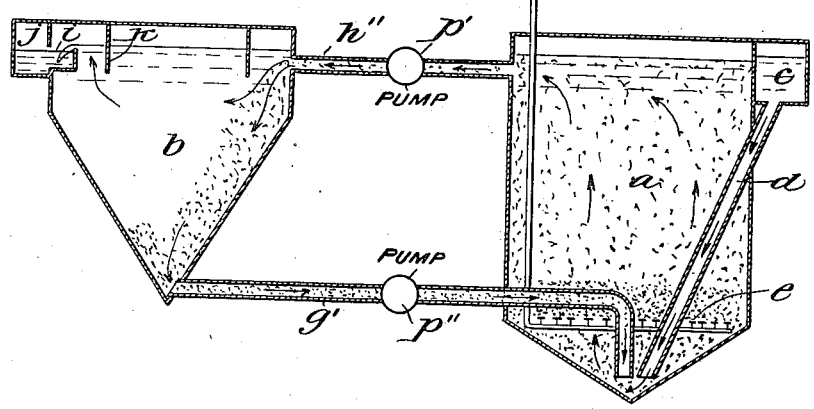
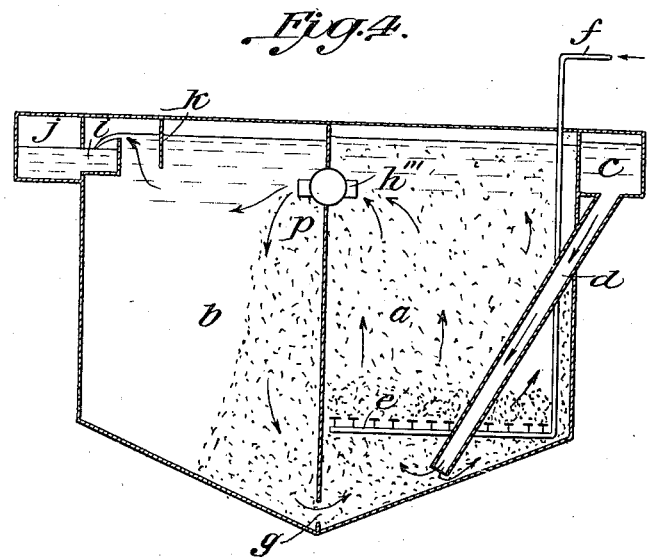

UNITED STATES PATENT OFFICE.

LESLIE C. FRANK, OF WASHINGTON, DISTRICT OF COLUMBIA.

PROCESS OF PURIFYING SEWAGE OR OTHER WASTES AND APPARATUS THEREFOR.

1,139,024. Specification of Letters Patent. Patented May 11, 1915.

Application filed April 2, 1915. Serial No. 18,863.

(DEDICATED TO THE PUBLIC.)

*To all whom it may concern:*

Be it known that I, LESLIE C. FRANK, a citizen of the United States, residing at Washington, in the District of Columbia, have invented certain new and useful Improvements in the Process of Purifying Sewage or other Wastes and Apparatus Therefor, of which the following is a specification.

The invention herein described may be used by the Government or any of its officers, or employees, in prosecution of work for the Government, or by any other person in the United States, without the payment of any royalty. (Act March 3, 1883.)

My invention relates to the purification of sewage or other wastes by two known processes of sedimentation and oxidation combined in a new manner.

I am aware of methods of treating sewage in which by a period of sedimentation part of the suspended matters are removed from a continuously passing stream of sewage.

I am also aware of methods of oxidizing sewage in which: (a) the sewage is permitted to flow into a holding device containing an amount of what is known as "activated slude" until filled to a desired depth, when the flow of sewage is discontinued; (b) aeration is then applied until the sewage is sufficiently oxidized, and then discontinued; (c) part of the suspended matters are permitted to settle out by a period of quiescent sedimentation; (d) all or part of the clarified supernatant liquid is permitted to escape.

I am not aware, however, of any method of treating sewage heretofore used by which it is possible in the same device or in connected devices to carry on the processes of oxidation and sedimentation continuously and simultaneously without interference one with the other.

The principal disadvantage of the said known methods of sedimentation is that the effluents from these methods are only partially purified. The principal disadvantages of the said known method of oxidation are that it necessitates what is known as the "fill and draw" method of applying sewage to any device and therefore: (a) consumes an amount of hydraulic head equivalent to the difference between the "full" and "empty" water levels in the device; (b) produces a low operation efficiency because the process is intermittent, and because of the necessary intervals of time for oxidation, settling, and emptying that must elapse between the periods of filling; (c) the deteriorating effect upon what is known as the "activated sludge" by the period of non-oxidation.

The principal advantages of my process of purification are: (a) that the effluent is both settled and oxidized; (b) that much less hydraulic head is consumed than in the "fill and draw" method; (c) that a high operation efficiency is secured because the two processes of oxidation and sedimentation are both continuous and simultaneous; (d) that the lack of periods of non-oxidation increases the efficiency of what is known as the activated sludge, to which periods of non-oxidation are harmful; (e) that it permits the use of a period of sedimentation independent of the period of oxidation, thus making it possible to use optimum periods for each of these two processes.

Figure 2:
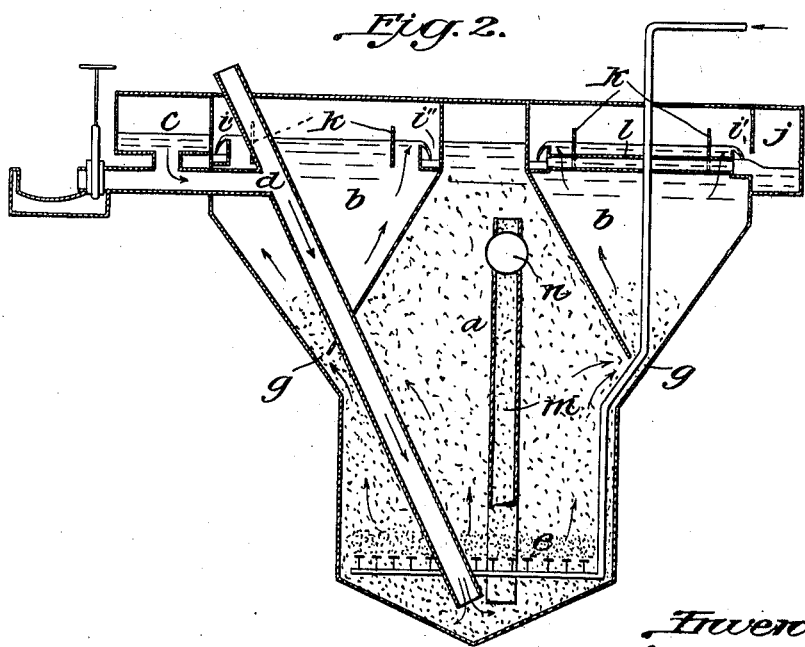

In the accompanying drawings, which form a part of these specifications, Figure 1 is a sectional elevation of one form of apparatus for purifying sewage or other wastes in accordance with my invention, in which form the inflowing sewage enters at the bottom of an oxidation chamber, is agitated in, oxidized in, and flows upward through, the oxidation chamber, overflows at the top of the oxidation chamber into a sedimentation chamber by air lift or other propelling means, settles out part of its sediment in the sedimentation chamber, finally part or all of the clarified liquid being permitted to escape from the settling chamber, the sediment and, if desired, part of the liquid, returning from the lower part of the sedimentation chamber into the oxidation chamber. Fig. 2 is a similar view of another form of apparatus for purifying sewage or other wastes in accordance with my invention. In this form the inflowing sewage enters at the bottom of an oxidizing chamber, is agitated in, oxidized in, and flows through the oxidation chamber, passes at a low velocity through a communicating passage into the lower portion of a sedimentation chamber, is relieved in the sedimentation chamber of part of its sediment; finally part or all of the clarified liquid being permitted to escape from the sedimentation chamber, the sediment returning from the lower part of the sedimentation chamber into the oxidation chamber. Fig. 3 is a similar view of another form of apparatus for purifying sewage or other wastes in accordance with my invention. In this form the action is the same as in Fig. 1, except that the oxidation and sedimentation processes, instead of being carried on in two compartments of the same device, are carried on in two chambers more or less remote from each other. This form will permit the easy conversion of two existing tanks for carrying on the aero tank process. Fig. 4 is a similar view of another form of apparatus for purifying sewage or other wastes in accordance with my invention. In this form the action is the same as in Fig. 1, except that the return of the sediment, and, if desired, part of the sewage, is effected through a passage at or near the bottom of the oxidation chamber. This form will permit the easy conversion of a single existing tank for carrying on the aero tank process.

In Fig. 1, (a) is an oxidation chamber; (b) is a sedimentation chamber; (c) is the main system sewage influent channel; (d) is the tank influent pipe; (e) represents an air comminuter grid, or other device for introducing oxygen into the sewage; (f) is the air supply pipe; (g) is a slot connecting the settling chamber with the oxidation chamber; (h) is the oxidation chamber vent; (i) is the effluent collector channel; (j) is the main system effluent channel; (k) is a scum board.

The operation of the tank is as follows: All or part of the sewage flowing along the main system influent channel (c) enters the horizontal branch of the tank influent pipe (d), flows through pipe (d) to the bottom of the oxidation chamber (a) with a sufficiently high velocity to prevent the settlement of solids at the bottom of this chamber. Rising through oxidation chamber (a), continuously agitated, aided if necessary by mechanical agitators, the sewage is brought into intimate contact with air or oxygen applied through air supply (f) and air comminuter (e). The absence of air bubbles in chamber (b) and the presence of air bubbles in chamber (a) above the plane of slot (g) causes the level of the liquid in vent (h) to rise above the level of the liquid in chamber (b). This causes part or all of the sewage to flow from oxidation chamber (a) into sedimentation chamber (b) through vent (h) rather than through slot (g), or, in fact, the flow through (h) may be increased to an amount greater than the amount of inflowing and outflowing sewage and hence cause a partial return flow from (b) to (a) through slot (g). This partial return flow need not be dependent upon the air lift function above described, but may be effected by any other propelling means situated between the oxidation and sedimentation chambers. The particles of sludge which pass with the sewage through (h) into (b) will settle out in sedimentation chamber (b) and return through slot (g) to the oxidation chamber (a), being aided, if desired, by the said return current through slot (g). The oxidized and settled effluent from sedimentation chamber (b) will pass into the effluent collector channel (i) and thence out into the main system effluent channel (j). (k) is a scum board to hold back particles lighter than water.

In Fig. 2, (h') is a gas vent, (i') and (i'') are effluent collector channels, (l) is an effluent passage connecting (i') with (i''). All other notation is as in Fig. 1.

In Fig. 3 (h'') is a connecting passage between (a) and (b) designed to perform the overflow function of vent (h), Fig. 1. (g') is a connecting passage between (b) and (a) designed to perform the sediment return function and, if desired, the partial sewage return function of slot (g) Fig. (1). The above functions of (h'') and (g') may also be aided or effected by a pump or other propelling means (p') or (p''). All other notation is as in Fig. (1).

In Fig. (4) (h''') is an overflow passage equipped if desired with some propelling means (p). (g'') is a sediment return or partial sewage return passage. All other notation is the same as in Fig. (1).

The following features of my process are specially emphasized:

(a.) Sewage may be made to enter the apparatus at some point other than the bottom of the oxidation chamber.

(b.) The passage of oxidation chamber contents into the sedimentation chamber may be effected, aided if desired by propelling means, at some point other than near the water surface of the oxidation chamber. This might be advantageous in case it is desired to hold back in the oxidation chamber for a time such matters as are lighter than water.

(c.) The oxidation process is promoted by the degree of fineness of the air or oxygen bubbles introduced into the oxygen chamber. I am aware, and do not claim as my invention, of a method by which chlorin gas is diffused into water in a finely divided state through carborundum or other porous material. This same method may be applied to the oxidation of sewage.

(d.) The oxidation process is promoted by the agitation of the contents of the oxidation chamber. This agitation may be effected (1) by the impact of the inflowing sewage, (2) as a secondary function of the oxygen introduction device, or (3) as a primary function of special agitators, e. g. propeller blades (n), inclosed if desired in a pipe (m) to increase the radius of agitation.

(e.) It is important, in both the oxidation and the sedimentation processes, to prevent the accumulation of quiescent sludge deposits. This may be done in the sedimentation chamber by inclining all surfaces to such a degree that sludge particles can not accumulate to a harmful extent; and also, if desired, by causing a return flow of sewage from the sedimentation chamber into the oxidation chamber through the sludge passage.

I claim as my invention:—

1. The herein described process of purifying sewage which consists in causing a flow thereof in a definite path, oxidizing the sewage in one portion of its path, causing a sedimentation in and decanting the clear liquid from a relatively remote portion of its path, and reintroducing the sediment into the oxidizing portion of the path.

2. The herein described process of purifying sewage, which consists in causing it to circulate around a horizontal axis (in a vertical plane), simultaneously oxidizing the same, continuously removing the clear liquid from a relatively still portion, from which the sediment has been settled, and reintroducing the sediment into the oxidizing portion.

3. The herein described process of purifying sewage which consists in causing it to circulate, simultaneously oxidizing the same in one portion of the path, continuously removing the clear liquid from a relatively still portion of the path from which the sediment has been settled, reintroducing the sediment and continuously adding fresh sewage into the oxidizing portion of the path.

4. The herein described process of purifying sewage which consists in continuously introducing fresh sewage into a body of the sewage in such a manner as to cause circulation and agitation, simultaneously oxidizing the sewage, permitting the velocity to decrease and ceasing agitation in one portion of its path, whereby sedimentation takes place, continuously removing the clear liquid, and directing the sediment back into the agitating portion.

5. The herein described process of purifying sewage which consists in simultaneously agitating it and oxidizing it in one portion of its path, continuously removing the clear liquid from a relatively still portion of the path from which the sediment has settled, continuously reintroducing the sediment and part of the sewage into the oxidizing and agitating portion of the path;—in which process the accumulation of harmful quiescent deposits of sludge in any portion of the path is prevented.

6. The herein described process of purifying sewage which consists in causing, by air lift or other propelling means, the overflow of a confined oxidizing and agitating portion, conducting the overflowed sludge and a portion of the liquid back to the oxidizing portion of the path, and decanting the clear liquid from the overflow.

7. The herein described process of purifying sewage which consists in causing it to circulate, simultaneously oxidizing the same, causing some agitating agency to hold the sludge particles in the oxidizing portion continuously in suspension, permitting the sewage so treated to deposit its sediment in a relatively non-agitated portion of the path, removing the clear liquid and bringing the deposited sediment back into the agitated portion of the path.

8. Apparatus for continuously purifying sewage consisting of an oxidation chamber, means for introducing sewage into the bottom thereof, means for introducing oxygen into the bottom thereof, a sedimentation chamber communicating with the upper portion of the oxidation chamber, means for returning the sediment into the oxidation chamber, means for removing the clarified liquid from the sedimentation chamber.

9. Apparatus for continuously purifying sewage consisting of an oxidation chamber, means for introducing sewage thereinto, means for introducing oxygen thereinto, means for agitating the contents thereof; a sedimentation chamber having surfaces so inclined as to prevent the accumulation of sludge deposits, a communication from the lowest portion of the sedimentation chamber into the oxidation chamber, means for removing the clarified liquid from the sedimentation chamber.

10. Apparatus for continuously purifying sewage consisting of an oxidation chamber, means for introducing sewage thereinto, means for introducing oxygen thereinto, means for agitating the contents thereof, a sedimentation chamber communicating with the upper portion of the oxidation chamber, the inner surfaces of both chambers being of such an inclination as to cause the continuous passage of solids depositing thereon to the region of influence of the agitating device, the lowest portion of the sedimentation chamber communicating with the oxidation chamber, means for causing the passage of the contents of the oxidation chamber into the sedimentation chamber, means for causing the return of the sediment and part of the sewage from the sedimentation chamber into the oxidation chamber, and means for
5 removing the clarified liquid from the sedimentation chamber.

In witness whereof I have signed my name to the foregoing specification in the presence of two witnesses.

LESLIE C. FRANK.

Witnesses:
H. B. HOMMON,
ALBERT F. STEVENSON.